United States Patent

[11] 3,582,977

| [72] | Inventor | David Alfred Smith |
| --- | --- | --- |
| | | Newcastle-Upon-Tyne, England |
| [21] | Appl. No. | 018,633 |
| [22] | Filed | Mar. 11, 1970 |
| [45] | Patented | June 1, 1971 |
| [73] | Assignee | C. A. Parsons & Company, Limited |
| | | Newcastle-upon-Tyne, England |
| [32] | Priority | Mar. 13, 1969 |
| [33] | | Great Britain |
| [31] | | 13,371 |

[54] DYNAMOELECTRIC MACHINES
7 Claims, 4 Drawing Figs.

| [52] | U.S. Cl. | 310/54, 310/64 |
| --- | --- | --- |
| [51] | Int. Cl. | H02k 9/00 |
| [50] | Field of Search | 310/54, 64, 262 |

[56] References Cited
UNITED STATES PATENTS

| 3,469,125 | 9/1969 | Kranz | 310/54 |
| --- | --- | --- | --- |
| 3,487,243 | 12/1969 | Wiedemann et al. | 310/54 |

Primary Examiner—D. X. Sliney
Attorney—Holman, & Stern

ABSTRACT: A dynamoelectric machine having a rotor body supporting a liquid cooled rotor winding, conductors of which protrude beyond the rotor body to form end winding portions, a rotor shaft, a passage in the rotor shaft for conveying liquid coolant to the rotor winding, a duct for carrying liquid coolant outside the shaft connected to the said passage, the said duct being located in the rotor body or immediately adjacent thereto, a further duct connected to or forming a continuation of the first mentioned duct, a manifold adapted to receive liquid coolant from the further duct and mounted so that it moves with an end winding portion of the rotor winding or the rotor body and is substantially independent of shaft movement and means connecting the manifold to the rotor winding for the flow of liquid coolant.

PATENTED JUN 7 1971

INVENTOR
DAVID ALFRED SMITH
BY Holman, Glascock,
Downing & Seebold
ATTORNEYS

DYNAMOELECTRIC MACHINES

This invention relates to dynamoelectric machines.

In large turbogenerators for power station use, it has been proposed to cool the conductors of the rotor winding by direct contract of a cooling liquid with the conductor material. In a typical arrangement a cooling liquid, such as distilled water, is circulated through internal passages in the conductor.

In one arrangement for cooling, liquid is fed to the rotor winding via an inlet passage passing along the rotor shaft and then through radial connections to the conductors forming the rotor winding. In order to reduce corrosion problems arising from the use of different metals in the water circuit, for example, copper for the conductors and steel for tubes carrying the water through the rotor shaft, and to prevent earthing of the conductors, the radial connections are of electrical insulating material. In addition, to cope with problems of differential movement between the rotor shaft and the rotor winding the radial connections are preferably of flexible material. With such arrangements, however, the forces acting on the radial connections are very high and sealing problems can arise especially as the pressure of the water is increased due to rotation of the rotor. These problems are particularly acute if the radial connections link the passage in the rotor shaft with individual conductors because of the multiplicity of radial connections required and difficulty of access to the connections in the limited space between overhanging portions of the end windings to which the connections are usually joined and the rotor shaft.

The multiplicity of radial connections can be reduced by using water manifolds feeding the individual conductors of the rotor winding but differential movement between the rotor shaft and the winding can still present problems in mounting the manifolds.

An object of the present invention is to provide a dynamoelectric machine with a liquid cooled rotor winding in which the aforesaid problems are reduced or minimized.

The invention consists in a dynamoelectric machine having a rotor body supporting a liquid cooled rotor winding, conductors forming the said winding protruding beyond the rotor body to form end winding portions, in which machine the liquid coolant is fed to passages in the rotor winding via a passage in the rotor shaft, through a duct carrying the liquid outside the shaft, which duct is located in the rotor body or immediately adjacent the rotor body, thence through a further duct or a continuation of the first mentioned duct to a manifold mounted so that it moves with the end winding portion of the rotor winding or the rotor body and is substantially independent of shaft movement and thence from the manifold to the aforesaid passages in the rotor winding.

The invention also consists in a dynamoelectric machine in accordance with the preceding paragraph in which the manifold is supported radially by a sleeve mounted on the rotor body.

The invention also consists in a dynamoelectric machine in accordance with the first of the preceding two paragraphs in which the manifold is supported radially by being directly attached to the rotor body.

The invention also consists in a dynamoelectric machine in accordance with the first of the preceding three paragraphs in which the manifold is supported radially by being attached to a retaining ring or end cap enclosing the end portion of the rotor winding.

The invention also consists in a dynamoelectric machine in accordance with any of the preceding four paragraphs in which the manifold is additionally attached to the rotor winding so as to move axially therewith.

The invention also consists in dynamoelectric machine in accordance with any of the preceding five paragraphs in which the connections between the manifold and the conductors of the rotor winding comprise a series of flexible connections of electrical insulating material extending substantially parallel to the rotor axis.

The invention also consists in a dynamoelectric machine substantially as described herein with reference to the accompanying drawings in which.

Figure 1:
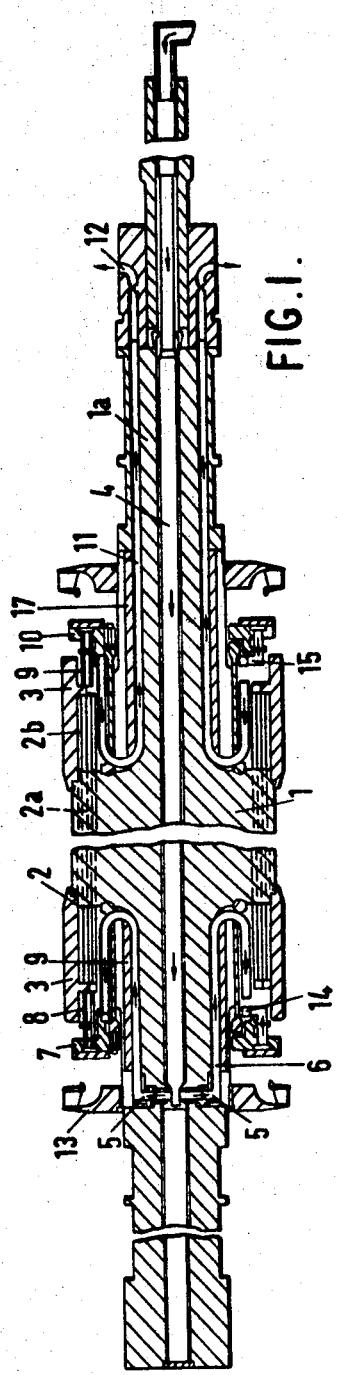
FIG. 1 is a longitudinal section through a rotor of a turbogenerator in accordance with one embodiment of the invention.

In carrying the invention into effect in the forms illustrated by way of example and referring first of all to FIG. 1, a turbogenerator comprises a stator (not shown) and a rotor body 1 supporting a liquid cooled winding 2. Conductors forming the rotor winding have slot embedded portions 2a (shown dotted) and portions 2b which protrude beyond the rotor body at each end thereof and form end winding portions. The end winding portions are held in position against the action of centrifugal forces by end caps 3 which are cylindrical and surround the end winding portions. The end caps are attached to the rotor body at their inner ends in a known manner.

Liquid coolant, for example, distilled water, is fed to the rotor winding via a passage 4 in rotor shaft 1a and then passes to ducts 5 which carry the liquid outside the rotor shaft. In the embodiment shown the ducts 5 are radial and are connected to further ducts 6 which extend axially in slots in the surface of the shaft to a position immediately adjacent the rotor body 1. The ducts 6 then bend through 180° and are connected to a coolant inlet manifold 7. The manifold 7 is attached directly or indirectly to the rotor body for radial location and is mounted on the end winding portion in a manner described in more detail below so that it moves in an axial direction with the end winding portion and hence its movement is substantially independent of shaft movement.

From the inlet manifold 7 the liquid coolant passes through flexible connections 8 of electrically insulating material which feed the coolant directly into the parts of the conductors forming the end winding. The coolant then flows through passages either in the conductors themselves or surrounding the conductor, or in tubes in contact with the conductors and then leaves the conductors via flexible connections 9 of electrically insulating material at the opposite end of the rotor. The connections 9 convey the coolant to an outlet manifold 10 from which it passes through ducts 11 similar to ducts 6. The ducts 11 convey the liquid coolant along the rotor shaft to radial ducts 12 from which ducts it leaves the rotor shaft and is collected in a liquid tight housing (not shown) surrounding the ducts 12. The coolant collecting in the housing is returned to the passage 4 in the rotor shaft after having been cooled in a heat exchange (not shown).

Whilst in some instances it may be possible to carry the coolant through radial ducts 5 disposed immediately adjacent the rotor body, it is more convenient from a practical standpoint to arrange them outboard of the end winding portion to facilitate access to the duct and seals associated therewith. In the embodiment illustrated the ducts are located in a portion of the shaft surrounded by the impeller 13 of a fan used to circulate a cooling gas such as hydrogen generally throughout the generator. The impeller can be removed to gain access to the radial connections.

In the embodiment shown the ducts 6 and the ducts 11 do not connect directly to the manifold, but are connected thereto by cross connections forming T junctions within the ducts. The section through the manifolds in the lower half of FIG. 1 is on a plane which shows these cross connections, cross connection 14 linking the duct 6 with manifold 7 and cross connection 15 linking duct 11 with manifold 10. Because of the different sectional plane of the manifold shown in the lower part of FIG. 1 the ducts 6 and 11 are shown stopping short of the manifold as the actual connection takes place in a different plane to that shown.

The cuts 6 and 11 are held in position in slots in the rotor shaft by wedge and packing devices 16 and 17 respectively.

Figure 2:
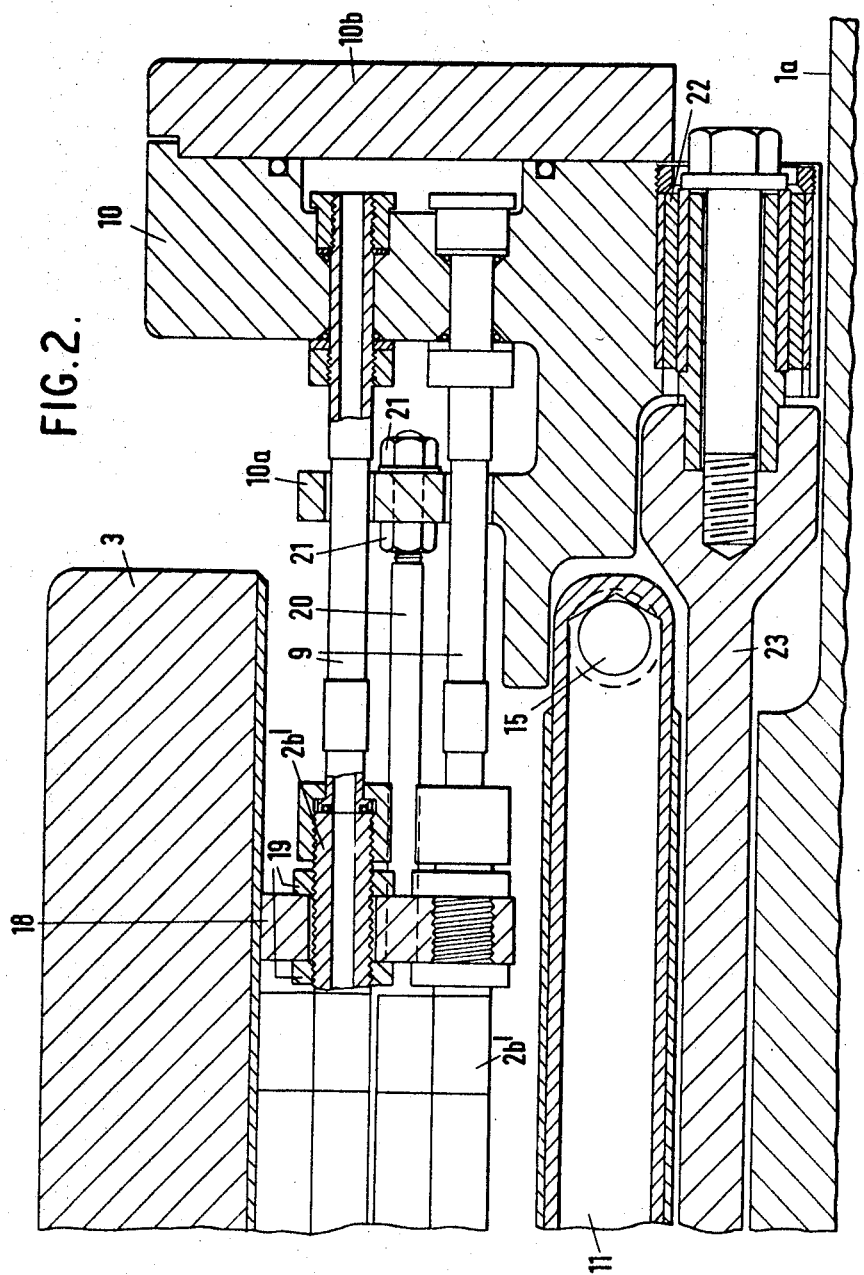
FIG. 2 is an enlarged view of part of the manifold and flexible connections used in the rotor illustrated in FIG. 1.

The manifold construction and connections thereto are shown more clearly in the enlarged section of FIG. 2. A ring 18 of electrical insulating material has holes which fit with clearance over conductor ends 2b' and the ring is locked in position on the conductor ends by locking nuts 19. Extending from the ring 18 are a number of tie rods 20 which pass through holes in a collar 10a which is an integral part of manifold 10. The rod 20 is locked to collar 10a by means of nuts 21. In this way the manifold is firmly connected to the winding and moves axially therewith. The manifold is also located radially by means of a number of resilient members 22 mounted on a support sleeve 23 attached to the rotor by a flange (not shown). These members 22 permit limited movement of the manifold relative to the support sleeve in an axial direction but minimize movement of the manifold in a radial direction. Each member 22 may comprise steel bushes separated by a resilient material such as rubber.

The flexible connections 9 may be of a material such as polytetrafluorethylene and engage in sealing relationship the conductor end 2b' and the wall of manifold 10 as shown. The manifold is sealed by a cover plate 10b.

Figure 3:
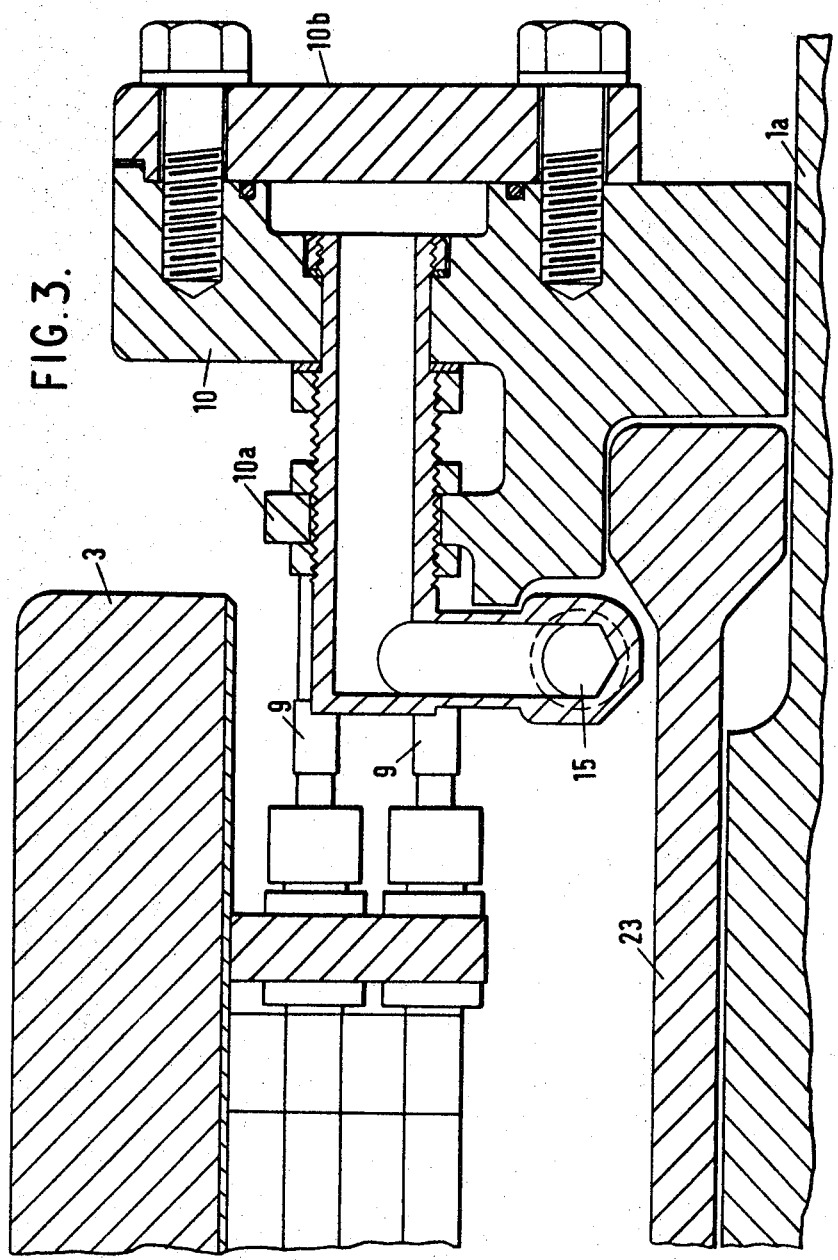
FIG. 3 is an enlarged view similar to that of FIG. 2 but is a section on a different radial plane.

As mentioned earlier the ducts 11 are not directly connected to the manifold but are joined to cross connections 15 which connect to the manifold in planes different from the one shown in section in FIG. 2. FIG. 3 is a section on a plane containing a connection to the manifold. It will be seen that the cross connections 15 are bent through at right angle at their ends and then through a further right angle to connect to the manifold.

The circuit for liquid coolant up to the flexible connections 9 and including the manifold may be of a metal such as stainless steel or other metal or material such as copper may be used.

Whilst in the form shown the liquid coolant is carried along the full length of the rotor shaft and thence into the winding other arrangements are possible within the scope of the invention. For example, the liquid coolant could pass radially outwards into the end winding adjacent the inlet end of the shaft flow through the rotor and out into a duct at the opposite end of the rotor shaft. The coolant could then pass into the condenser of an associated steam turbine.

A preferred form of rotor winding for a liquid cooled rotor in accordance with the invention is of the diamond coil type commonly used in stator windings for turbogenerators. Such a winding is shown diagrammatically in a developed view in FIG. 4 and in effect is a 'double layer' diamond coil winding in the sense that there are two separate diamond coil windings of the conventional kind one superimposed on the other in the rotor slots. For the two pole rotor shown there are four conductors per slot. Such an arrangement permits easy access for making joints and end connections.

The electrical connections are shown at 24 and 25. In the embodiment illustrated each connection is split into two parts for passage along ducts in the rotor shaft to a DC supply. Two such ducts can be arranged one diametrically opposite to the other and by splitting the positive and negative connections into two as shown each duct can carry a positive and negative lead thus reducing eddy currents in the rotor shaft and bearings. The outlet ducts 11 for the liquid coolant of which there are two in the form shown in FIG. 1 would also be arranged diametrically opposite one another in the rotor shaft but on a diametrical plane say at 90° to the diametrical plane containing the electrical connections 24, 25.

Figure 4:
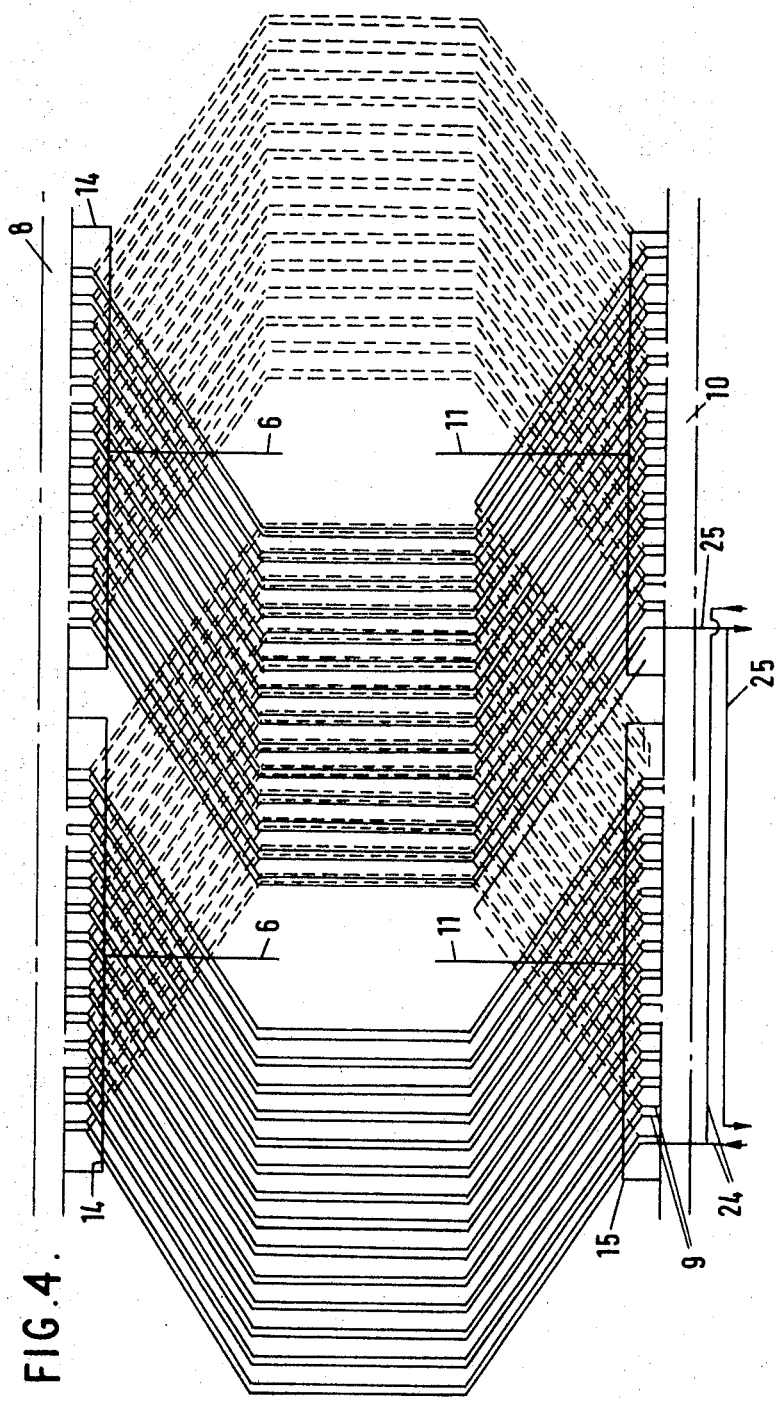
FIG. 4 shows diagrammatically a suitable rotor winding in accordance with the invention.

In FIG. 4 the inlet manifold 8 and the outlet manifold 10 are both shown diagrammatically as are the ducts 6, 11 and cross connections 14 or 15. It will be seen that the manifolds extend in annular fashion around the rotor shaft but this is not essential.

Whilst the arrangement has been described with particular reference to a turbogenerator with a DC excited rotor winding the invention can be applied to rotor windings of other dynamoelectric machines which need to be liquid cooled.

An arrangement in accordance with the invention enables the manifolds to move independently of the shaft and hence they are not subjected to movement produced by shaft deflection. Further by carrying the liquid coolant into the shaft at positions of minimum flexure, for example, by passing through the rotor body or through ducts mounted immediately adjacent the rotor body strains on the ducting system due to differential movement of shaft and rotor body are minimized.

The term liquid coolant as used herein is intended to include within its scope gas coolant such as hydrogen at very high pressures, for example, of the order of 2,000 lb.

I claim:

1. A dynamoelectric machine having a rotor body supporting a liquid cooled rotor winding, conductors of which protrude beyond the rotor body to form end winding portions, a rotor shaft, a passage in the rotor shaft for conveying liquid coolant to the rotor winding, a duct for carrying liquid coolant outside the shaft connected to the said passage, the said duct being located in the rotor body or immediately adjacent thereto, a further duct connected to or forming a continuation of the first mentioned duct, a manifold adapted to receive liquid coolant from the further duct and mounted so that it moves with an end winding portion of the rotor winding or the rotor body and is substantially independent of shaft movement and means connecting the manifold to the rotor winding for the flow of liquid coolant.

2. A machine as claimed in claim 1 in which the manifold is supported radially by a sleeve mounted on the rotor body.

3. A machine as claimed in claim 1 in which the manifold is supported radially by being directly attached to the rotor body.

4. A machine as claimed in claim 1 in which the manifold is supported radially by being attached to a retaining ring enclosing the end portion of the rotor winding.

5. A machine as claimed in claim 1 in which the manifold is attached to the end of the end winding portion so as to move axially therewith.

6. A machine as claimed in claim 1 in which the means connecting the manifold to the rotor winding comprise flexible connections of electrical insulating material.

7. A machine as claimed in claim 1 in which the further duct is disposed along the outside of the shaft and substantially parallel to the rotor passage.